United States Patent [19]

Taniguchi

[11] Patent Number: 4,733,367
[45] Date of Patent: Mar. 22, 1988

[54] SWAP CONTROL APPARATUS FOR HIERARCHICAL MEMORY SYSTEM

[75] Inventor: Toshihisa Taniguchi, Hatano, Japan

[73] Assignee: Hitachi, Ltd., Tokyo, Japan

[21] Appl. No.: 795,452

[22] Filed: Nov. 6, 1985

[30] Foreign Application Priority Data

Nov. 7, 1984 [JP] Japan ............................. 59-233328

[51] Int. Cl.⁴ ............................................ G06F 13/18
[52] U.S. Cl. .................................................... 364/900
[58] Field of Search ... 364/200 MS File, 900 MS File

[56] References Cited

U.S. PATENT DOCUMENTS 4,323,968  4/1982  Capozzi ............................ 364/200
4,395,763  7/1983  Takahashi ......................... 364/900
4,550,367 10/1985  Hattori et al. .................... 364/200

Primary Examiner—Archie E. Williams, Jr.
Assistant Examiner—Emily Y. Chan
Attorney, Agent, or Firm—Antonelli, Terry & Wands

[57] ABSTRACT

In a multiple-block-per-entry buffer memory (BS) of the swap or store-in type, a swap-out buffer (SOB) having a capacity for at least a block is provided. On the occasion of replacing, a memory access sequence control responds to change bits and validity bits associated with an entry to be replaced as well as the block address designated for memory access so as to execute the data transfer from a main memory (MS) to BS in preference to the sweeping-out of data from BS to SOB so long as the block to be replaced need not be stored in MS. If the block to be replaced needs to be stored, the sweeping-out into SOB is executed with the utmost priority, and the data transfer from MS is then executed in preference to the sweeping-out of any other blocks to be stored into MS.

4 Claims, 5 Drawing Figures

FIG. 4

| $A_0$ | 0 | 0 | 0 | 0 | 1 | 1 | 1 | 1 |
|---|---|---|---|---|---|---|---|---|
| $A_1$ | 0 | 0 | 1 | 1 | 0 | 0 | 1 | 1 |
| B | 0 | 1 | 0 | 1 | 0 | 1 | 0 | 1 |
| OPERATION TYPE | I | I | II | II | III | III | IV | IV |
| OPERATION SEQUENCE 1 | TRANSFER DATA FROM MS TO BLOCK 0 | TRANSFER DATA FROM MS TO BLOCK 1 | TRANSFER DATA FROM MS TO BLOCK 0 | TRANSFER DATA FROM MS TO BLOCK 1 | SWEEP OUT BLOCK 1 INTO SOB | TRANSFER DATA FROM MS TO BLOCK 1 | SWEEP OUT BLOCK 0 INTO SOB | SWEEP OUT BLOCK 1 INTO SOB |
| 2 | | | SWEEP OUT BLOCK 1 INTO SOB | SWEEP OUT BLOCK 0 INTO SOB | TRANSFER DATA FROM MS TO BLOCK 1 | SWEEP OUT BLOCK 0 INTO SOB | TRANSFER DATA FROM MS TO BLOCK 0 | TRANSFER DATA FROM MS TO BLOCK 1 |
| 3 | | | TRANSFER DATA FROM SOB TO MS | SAME AS THE LEFT | SAME AS THE LEFT | SAME AS THE LEFT | SAME AS THE LEFT (BLOCK 0) | SAME AS THE LEFT (BLOCK 1) |
| 4 | | | | | | | SWEEP OUT BLOCK 1 INTO SOB | SWEEP OUT BLOCK 0 INTO SOB |
| 5 | | | | | | | TRANSFER DATA FROM SOB TO MS | SAME AS THE LEFT |

SWAP CONTROL APPARATUS FOR HIERARCHICAL MEMORY SYSTEM

BACKGROUND OF THE INVENTION

The present invention relates to a hierarchical memory system, for instance, a memory system comprising a buffer memory and a main memory, and more particularly to the control of a memory system of the type in which the storing of updated data into an upper level memory is carried out according to the swap or store-in system.

In a hierarchical memory system in which a lower level memory (e.g. buffer memory) contains a partial copy of the content of an upper level memory (e.g. main memory), according to the wellknown swap or store-in system, when a processor updates certain data in the lower level memory, the corresponding data in the upper level memory is not updated, but, when a block containing this updated data is replaced with another block from the upper level memory, the replaced block is transferred to the upper level memory and stored therein, thereby to update the content of the upper level memory. The data transfer from the lower level memory to the upper level memory for such purpose is hereinafter referred to as swap-out. An improvement of this system is described in the Japanese Patent Publication No. 16262/1983. In this improvement, a memory (hereinafter referred to as a swap-out buffer) for temporarily storing the data of a block to be swapped out (hereinafter referred to as swap-out data) is provided. On the occasion of swapping-out, swap-out data from the lower level memory is moved into the swap-out buffer while a transfer request for the desired block is issued to the upper level memory, and, after the transfer from the upper level memory to the lower level memory is completed, the swap-out data in the swap-out buffer is transferred to the upper level memory. This process will later be described in more detail. By this improvement, it is not necessary to complete the transfer of swap-out data to the upper level memory before transferring a new data block to the lower level memory, and, accordingly, the time required before obtaining the desired data is shortened.

On the other hand, as an improvement for increasing the capacity of the lower level memory, a system in which a plurality of data blocks are contained in one entry (access unit specified by a row address and column address) of the lower level memory (later described in detail) is described in the Japanese Patent Publication No. 12222/1982. This system is advantageous in the point that it is of low cost as compared with a solution by increasing the number of columns.

However, if the above-mentioned swap-out buffer system is directly applied to this multiple-block-per-entry system, the data transfer from the upper level memory is not executed till the data of all blocks requiring swap-out in one entry is moved into the swap-out buffer, and, as a result, if there are many blocks to be swapped out, the data transfer from the upper level memory will be delayed. In addition, the swap-out buffer must have a capacity which can contain all the blocks in one entry.

SUMMARY OF THE INVENTION

An object of the present invention is, in a hierarchical memory system of the type in which the multiple-block-per-entry system is adopted in the lower level memory and a swap-out buffer is provided, to shorten the time that is required before the data transfer from the upper level memory in a memory operation including swap-out.

Another object of the present invention is to reduce the required swap-out buffer capacity in a memory system of the above-mentioned type.

A block in the lower level memory located in a position in which data being transferred from the upper level memory is to be stored must be swept out at once into the swap-out buffer provided it needs to be swapped out at all. In this regard, such sweeping-out is unnecessary if the block need not be swapped out (as it was not updated by the processor). In addition, the sweeping-out of other blocks belonging to the same entry into the swap-out buffer can be postponed without any trouble until the data transfer from the upper level memory is completed.

Paying attention to the above points, this invention examines information from the point of view of ascertaining the necessity of swap-out for each block and information specifying the access target block and, according to the result thereof, it controls the execution sequence of the sweeping-out to the swap-out buffer and the data transfer from the upper level memory so that the latter is given priority as far as condition permits. More specifically, when the replace target block (i.e. a block corresponding to the access target block in the replace target entry) need not be swapped-out, the data transfer from the upper level memory is executed first, and then, the block needing swap-out is transferred through the swap-out buffer to the upper level memory. However, when the replace target block needs to be swapped out, only that block is swept out into the swap-out buffer first, and immediately thereafter, the data transfer from the upper level memory is executed, and the sweeping-out of the blocks needing swap-out into the swap-out buffer is carried out further after that.

It is enough if a swap-out buffer of a capacity capable of containing one block of data is provided. In that case, data transfer is controlled so that the data transfer to the upper level memory is carried out each time one block is swept out into the swap-out buffer.

By the present invention, the transfer of a desired block from the upper level memory to the lower level memory can be executed after the time required for sweeping out one block from the lower level memory to the swap-out buffer at the latest, and, particularly, if the replace target block need not be swapped out, the data transfer from the upper level memory is executed at once independently of other blocks. Accordingly, the desired data can be obtained in a short time.

In addition, since the capacity of the swap-out buffer can be curtailed up to that for one block, the quantity of hardware can be reduced.

BRIEF DESCRIPTION OF THE DRAWINGS

FIG. 4 is a diagram showing the processing sequences which are carried out according to various conditions in the embodiment of FIG. 1.

DESCRIPTION OF THE PREFERRED EMBODIMENT

Figure 2:
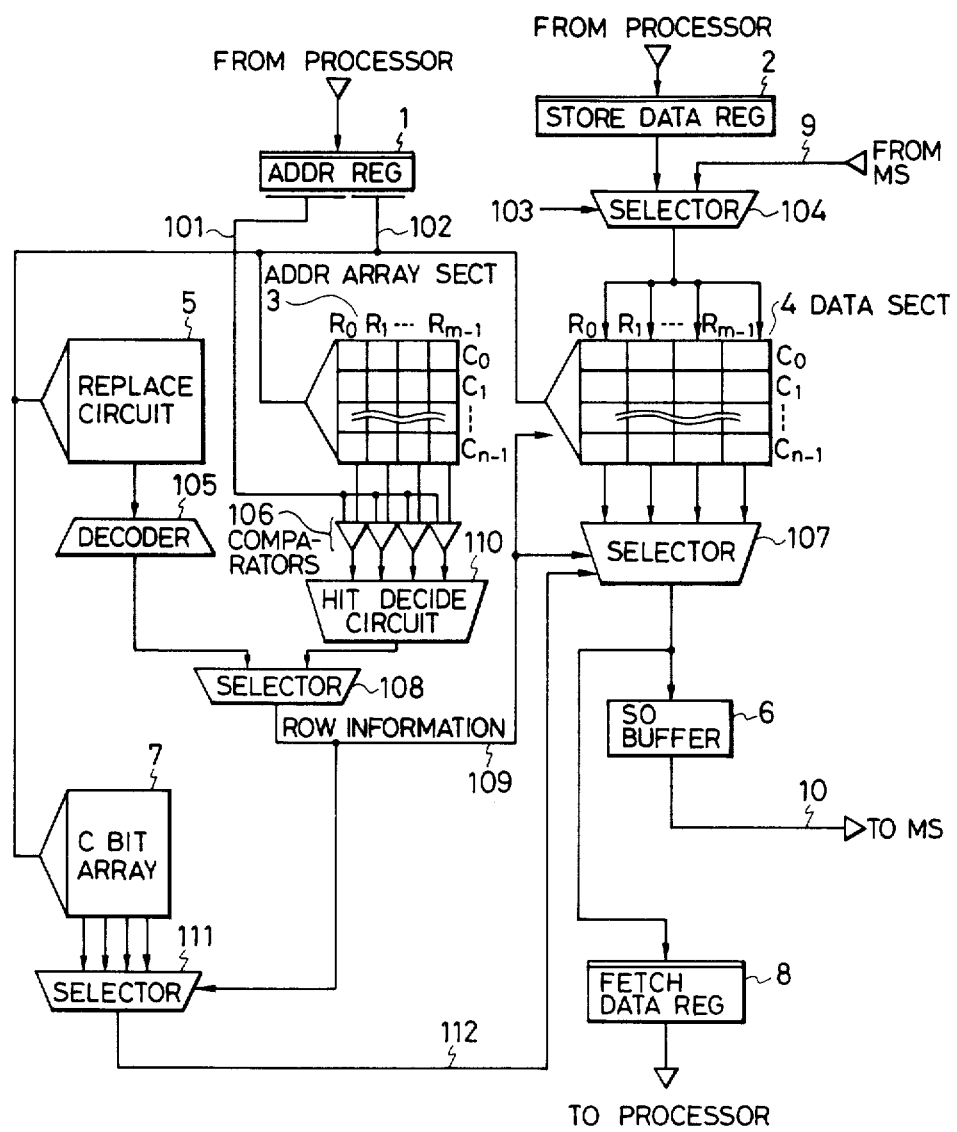
FIG. 2 is a block diagram of a single-block-per-entry buffer memory provided with a swap-out buffer.

First, the conventional swap-out buffer system and the multiple-block-per-entry system constituting the background of the present invention are explained. FIG. 2 shows a conventional single-block-per-entry buffer memory provided with a swap-out buffer. An address register 1 is a register for holding a memory access address. A store data register 2 is a register for holding data to be stored from a processor. The buffer memory proper comprises an address array section 3 and a data section 4. The buffer memory in this example has n X m entries arranged in n columns ($C0$-$C_{n-1}$) and m rows ($R0$-$R_{m-1}$), and each entry contains a single data block.

In the access operation, the low order portion 102 of the memory access address selects a column each in the address array section 3 and the data section 4, and, as a result, the whole content of the selected column is read out from each section. The m address data read out from the address array section 3 are respectively compared with the high order portion 101 of the memory access address by comparators 106. If coincidence is detected in any row position, it is concluded that a block containing the desired data exists (or a hit occurs) in the corresponding row position of the data section 4, and a hit decide circuit 110 sends information indicating the hitting row position as row information 109 through a selected 108 to a selector 107. From the data read out from the data section 4, the selector 107 selects the data in the row position indicated by the row information 109 and sends it to a fetch data register 8.

Next, a description will be given of the case of no hit. A replace circuit 5 is a circuit which decides a row in the selected column into which the desired block fetched from the main memory (MS), not shown, is to be written (a replace target row) when the desired data block does not exist in the buffer memory. For instance, according to the so-called LRU algorithm, a row in the selected column that has not been accessed for the longest period of time is selected as the replace target row. A C bit array 7 contains a group of bits (C bits) respectively corresponding to the blocks in the data section 4, and each bit indicates whether the corresponding block underwent any update operation or not. Therefore, if a C bit shows that the corresponding block has been updated, that block is subjected to swapping-out.

When the hit decide circuit 110 fails to detect a hit, the replace circuit 5 generates information indicating a replace target row in the selected column, and this information is converted to row information in a decoder 105 and is supplied through the selector 108 to the data section 4 as storage location information as well as to the selector 107. During this, the corresponding column of the C bit array 7 is read out and selected by a selector 111 according to the row information 109 to issue a signal 112 indicating whether the replace target block needs to be swapped-out or not. If swap-out is needed, the data of this block is transferred through the selector 107 to a swap-out buffer (SO buffer) 6, and it is latter transferred through a swap-out data path 10 to the main memory (MS). By temporarily storing the swap-out data in the swap-out buffer 6 instead of directly transferring it to the main memory, the data transfer from the main memory can be executed at an early stage. Data transferred from the main memory (MS) is stored in a designated block position of the data section 4 through a path 9 and a selector 104.

Figure 3:
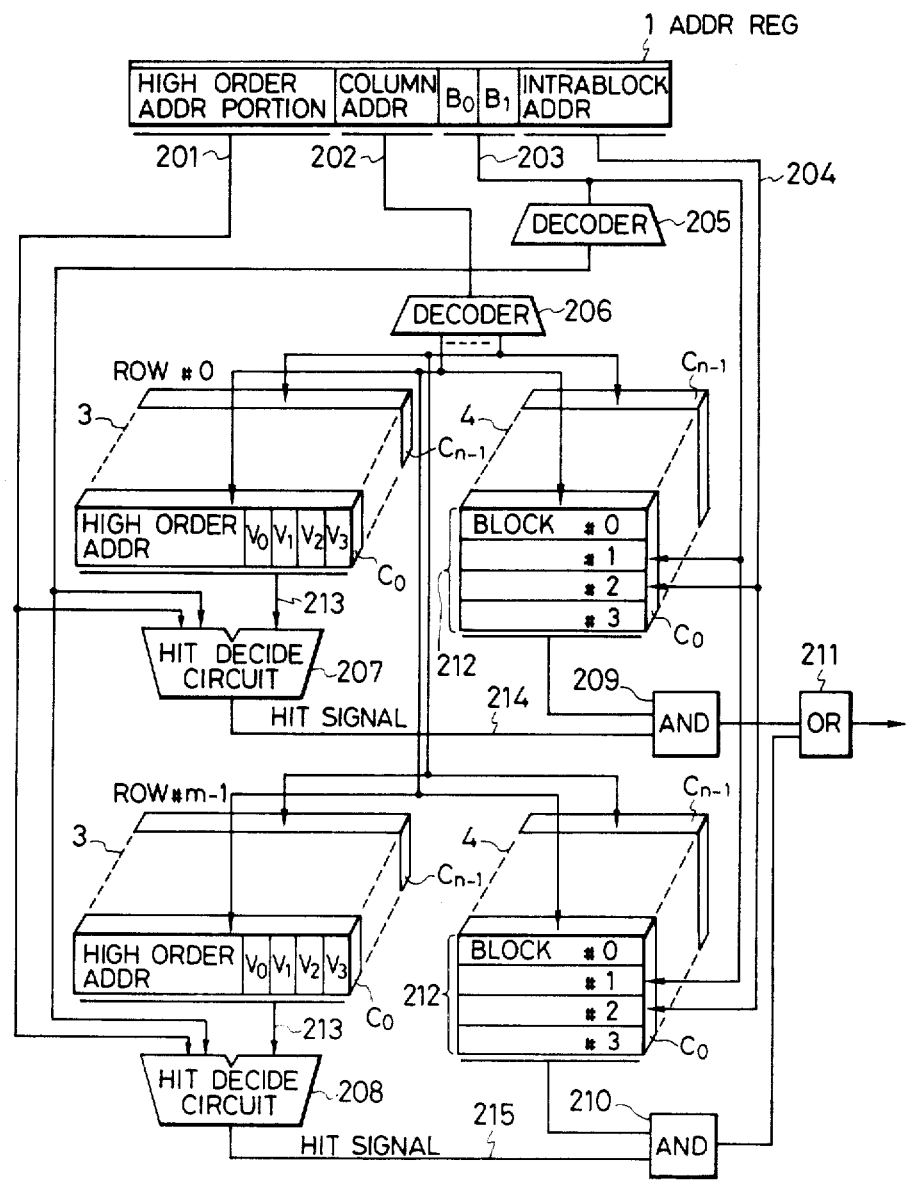
FIG. 3 is a block diagram showing the main portion of a multiple-block-per-entry buffer memory.

FIG. 3 shows the main portion of a buffer memory according to the multiple-block-per-entry system. In this example, one entry (212) contains four blocks (#0-#3). For simplicity, only row #0 and row #m−1 are shown.

A memory access address held in an address register 1 comprises a high order address 201, column address 202, intraentry block address (B0, B1) 203 and intrablock address 204. The high order address 201 is given to hit decide circuits 207 and 208 for the respective rows, and the column address 202 is decoded by a decoder 206 to select a column each in an address array section 3 and a data section 4. The block address 203 is supplied to the hit decide circuits 207 and 208 after being decoded by a decoder 205, and also directly supplied to the data section 4 to select a block in an entry. The intrablock address 204 is sent to the data section 4 to select a data unit (e.g. a word) within a block.

The address array section 3 holds, in correspondence to each entry 212, the high order address of the blocks in the corresponding entry and validity bits V0–V3 for the respective blocks. The validity bits V0–V3 are set to "1" if data exist in the corresponding blocks, and are set to "0" if data does not exist. The hit decide circuits 207 and 208 receive the high order address 201 of the memory access address, the output of the decoder 205 which receives the block address 203, and the output from the address array section 3, and they issue a hit signal 214 or 215 if there is coincidence between the high order addresses and also the validity bit for the block specified by the block address 203 is "1". Accordingly, the desired data within the designated block in the designated column read out from the row for which the hit signal 214 or 215 is issued is sent out through an AND circuit 209 or 210 and an OR circuit 211.

As for swapping-out, a mechanism (not shown) similar to that shown in FIG. 2 provides a replace target entry, and examines the C bits (CB0–CB3, not shown, with "1" indicating the occurrence of updating) prepared correspondingly to the blocks #0–#3 for each entry. Succeedingly, all the blocks in the replace target entry for which the C bit and validity bit are both "1" are swapped out. After this swap-out is completed, the data transfer from the main memory is performed. However, this data transfer from the main memory is performed only for the one block to which the access has been requested.

Also in this system, by providing a swap-out buffer, the timing of executing the data transfer from the main memory to the buffer memory can be advanced. However, if a plurality of blocks requiring swap-out exist in the replace target entry, the data transfer from the main memory has to be suspended until all of them are swept out into the swap-out buffer. Providing against the worst case, the capacity of the swap-out buffer must be enough to contain all the blocks in one entry (four blocks for the above example).

Figure 1:
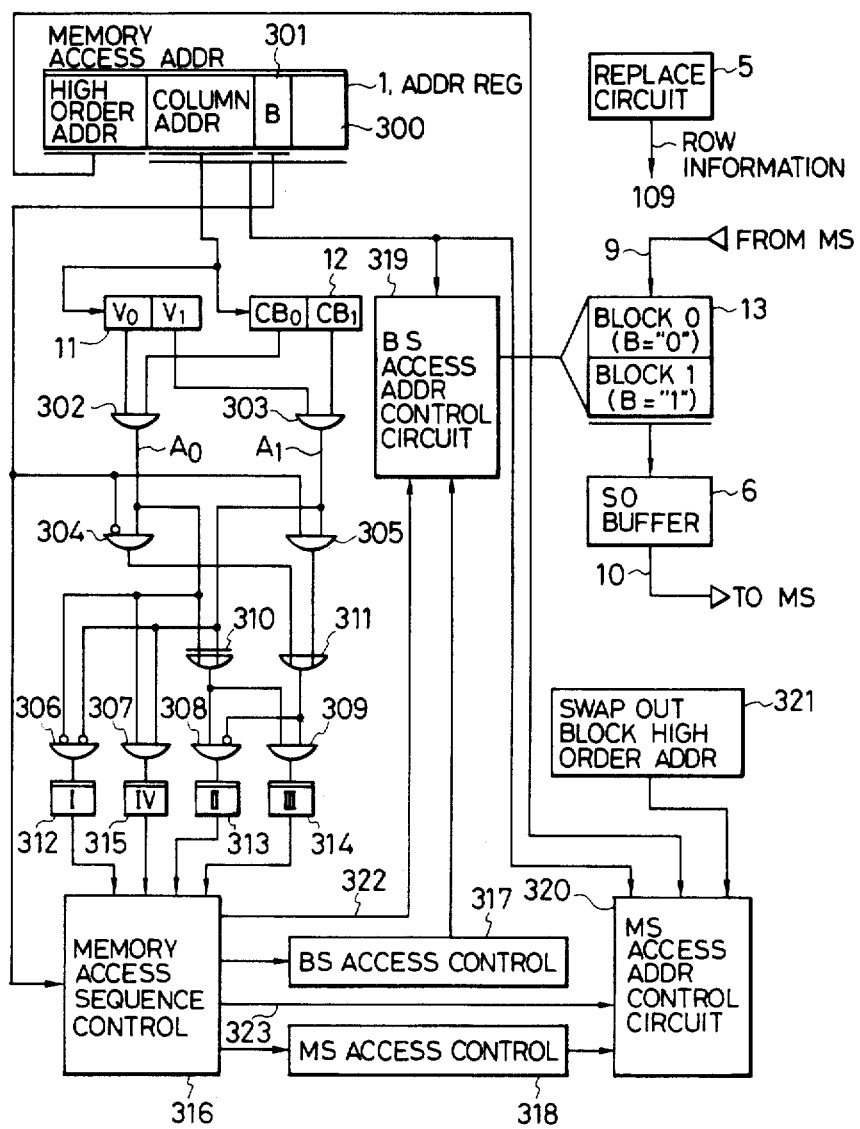
FIG. 1 is a block diagram showing the main portion of an embodiment of the present invention.

FIG. 1 shows the portion related to the swap-out processing of an embodiment of the present invention. The remaining portions are the same as in FIGS. 2 and 3. The reference numerals in FIG. 1 which are same as in FIG. 2 represent equivalent elements. However, in this embodiment, to simplify the explanation, one entry contains two blocks. Accordingly, a block address 301 in the memory access address comprises only one bit (B). A field 300 contains an intrablock address. As in the apparatus of FIG. 1, a replace circuit 5 issues row information 109 indicating a replace target row. An entry (a replace target entry) 13 in the data section selected by this row information and the column address includes block 0 (block address B="0") and block 1 (B="1"). In addition, similarly selected validity bit section 11 and C bit array 12 for the replace target entry 13 contain V0, V1 and CB0, CB1, respectively, corresponding to the block 0 and the block 1. An AND circuit 302 receives V0 and CB0 to issue a bit A0 indicating that the block 0 is to be swapped out, and an AND circuit 303 receives V1 and CB1 to issue a bit A1 indicating that the block 1 is to be swapped out.

An operation type decide circuit comprising AND circuits 304-309, an exclusive OR circuit 310 and an OR circuit 311 decides a memory access operation sequence type (I-IV) to be executed according to a combination of the swap-out block indicating bits A0 and A1 and the block address bit B, and sets one of the flip-flops 312-315 corresponding to the type. A memory access sequence control 316 receives the outputs of the flip-flops 312-315 and the block address bit B to actuate a BS (buffer memory) access control 317 and a MS (main memory) access control 318 a predetermined number of times in a predetermined order according to the decided operation sequence type, while supplying on each actuation block addresses 322 and 323 to be specified to a BS access address control circuit 319 and a MS access address control circuit 320, respectively. A swap-out block high order address 321 represents the high order address which is held in the address array location corresponding to the entry containing the block to be swapped out. FIG. 4 shows the operation types I-IV which are set in the flip-flops 312-315 and the operation sequences which are designated by the memory access sequence control 316 for the respective combinations of values of the swap-out block indicating bits A0 and A1 and the block address bit B. In the figure, "SOB" means the swap-out buffer 6, and "MS" means the main memory.

As apparent from FIG. 4, if the block indicated by the block address B in the replace target entry, that is, the replace target block (block 0 if B="0", block 1 if B="1") need not be swapped out (A0="0" for block 0,A1="0" for block 1), the data transfer from the main memory to this block is executed instantly. Even if all the blocks in the replace target entry need to be swapped out (A0=A1 ="1"), the data transfer from the main memory is executed immediately after only one block is swept out into the swap-out buffer 6.

Figure 5:
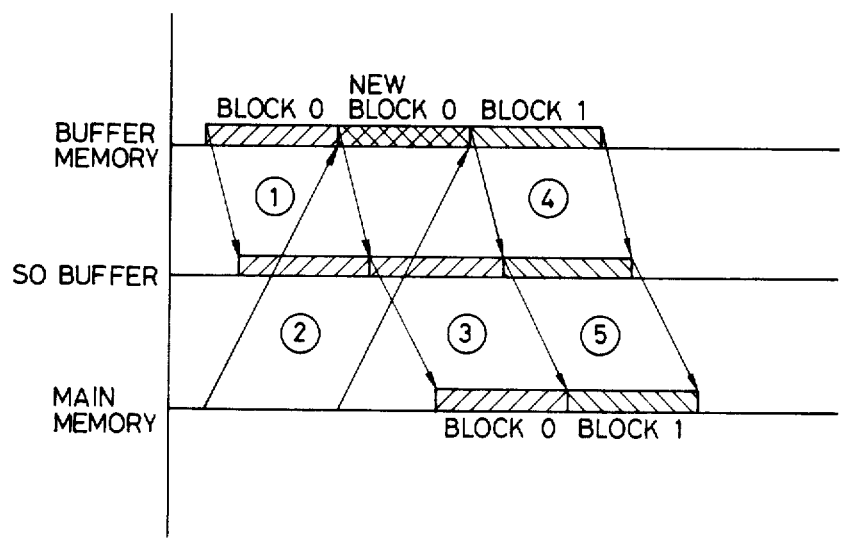
FIG. 5 is a time chart of a typical processing sequence which is carried out in the embodiment of FIG. 1.

FIG. 5 shows as a typical case the time chart of the operation sequence for the case where A0=A1 ="1" and B="0". In the figure, the encircled numerals correspond to the operation sequence numbers as shown in FIG. 4.

If the buffer memory (BS) has a speed sufficiently higher than that of the main memory (MS) so that, even if both of them are started simultaneously, the transfer of one block of data from BS to the swap-out buffer (SOB) is completed before the data to be transferred from MS arrives at BS, operation 1 and operation 2 can be initiated simultaneously in the operation sequences of the types II-IV. This simultaneous initiation results in the reversal of the execution order of operation 1 and operation 2 in the operation sequence of the type II. However, this reversal of the execution order does not contradict the present invention, because it does not mean a delay of the data transfer from MS to BS. On the contrary, it is advantageous in that it results in the reduction of the total operation time.

In the above embodiment, it is enough if SOB 6 has a capacity for a single block. However, it is needless to say that SOB 6 may have a capacity for two blocks. In this case, the data transfer from SOB to MS can be executed after all the blocks to be swapped out are transferred to SOB.

What is claimed is:

1. A swap control apparatus for a hierarchical memory system which comprises:
   an upper level memory;
   a lower level memory having a plurality of entry areas as access unit areas each consisting of a plurality of block areas for holding a partial copy of the content of said upper level memory in blocks in a multiple-block-per-entry manner;
   means for holding first information indicating a necessity of swap-out for each block in each entry area in said lower level memory;
   means for generating an address including second information specifying an access target block to be accessed in an entry area;
   replace control means for designating a replace target entry area in said lower level memory in which a block corresponding to said access target block forms a replace target block to be replaced with a block that is transferred from said upper level memory;
   swap-out buffer means connected in a data path from said lower level memory to said upper level memory for temporarily holding data to be swapped out to said upper level memory; and
   memory access sequence control means operatively connected to said upper level memory, said lower level memory, said holding means, said generating means and said replace control means, and responsive to said first and second informations and a replace target entry area designation by said replace control means, for controlling the operations of said upper level memory and lower level memory so that, when said first and second informations indicate that a replace target block in the replace target entry area does not need to be swapped out while another block in the replace target entry area needs to be swapped out, data transfer from the upper level memory to the replace target entry area is effected with priority over data transfer of said another block to the swap-out buffer means, so that all the blocks needing to be swapped out in said replace target entry area are swapped out when said replace target block is replaced.

2. A swap control apparatus according to claim 1 wherein said memory access sequence control means further controls the operations of said upper level memory and said lower level memory such that, when said first and second informations indicate that the replace target block needs to be swapped out, data transfer of the replace target block to the swap-out buffer means is effected with the utmost priority and data transfer from the upper level memory to the replace target block area is effected with a lower priority.

3. A swap control apparatus according to claim 2 wherein said swap-out buffer means has a capacity for a single block, and said memory access sequence control means includes means for effecting the data transfer from said lower level memory to said upper level memory through said swap-out buffer on a block-by-block basis.

4. A swap control apparatus according to claim 3 wherein said first information includes change bits indicating whether data in the respective blocks have been changed or not and validity bits indicating whether data in the respective blocks are valid or not.

* * * * *